(12) United States Patent
Hessling-Von Heimendahl et al.

(10) Patent No.: US 10,906,665 B1
(45) Date of Patent: Feb. 2, 2021

(54) METHOD OF EMITTING AN ANTI-COLLISION LIGHT OUTPUT FROM AN UNMANNED AERIAL VEHICLE, ANTI-COLLISION LIGHT FOR AN UNMANNED AERIAL VEHICLE, AND UNMANNED AERIAL VEHICLE COMPRISING THE SAME

(71) Applicant: Goodrich Lighting Systems GmbH, Lippstadt (DE)

(72) Inventors: Andre Hessling-Von Heimendahl, Koblenz (DE); Anil Kumar Jha, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/712,457

(22) Filed: Dec. 12, 2019

(30) Foreign Application Priority Data

Aug. 15, 2019 (EP) .................................. 19191996

(51) Int. Cl.
| | |
|---|---|
| *B64D 47/06* | (2006.01) |
| *B64C 39/02* | (2006.01) |
| *H05B 47/16* | (2020.01) |
| *H05B 45/20* | (2020.01) |
| *F21V 23/04* | (2006.01) |

(52) U.S. Cl.
CPC ............ *B64D 47/06* (2013.01); *B64C 39/024* (2013.01); *H05B 45/20* (2020.01); *H05B 47/16* (2020.01); *B64C 2201/027* (2013.01); *B64C 2201/146* (2013.01); *B64D 2203/00* (2013.01); *F21V 23/0407* (2013.01); *F21V 23/0435* (2013.01)

(58) Field of Classification Search
CPC ............ B64C 39/024; B64C 2201/146; F21V 23/0407; F21V 23/0435; G01S 17/93; G01S 17/933
See application file for complete search history.

(56) References Cited

U.S. PATENT DOCUMENTS

| | | | |
|---|---|---|---|
| 7,118,261 | B2 | 10/2006 | Fredericks et al. |
| 7,999,698 | B2 | 8/2011 | Annati et al. |
| | | (Continued) | |

FOREIGN PATENT DOCUMENTS

| | | |
|---|---|---|
| EP | 2130766 A2 | 12/2009 |
| JP | 6544550 B1 | 7/2019 |

OTHER PUBLICATIONS

Anthony R. Foxx, et al.: "Operation and Certification of Small Unmanned Aircraft Systems", In: Rules and Regulations, Jun. 28, 2016 (Jun. 28, 2016), Department of Transportation—Federal Aviation Administration, vol. 81, 152 pages.
(Continued)

*Primary Examiner* — Thuy Vinh Tran
(74) *Attorney, Agent, or Firm* — Cantor Colburn LLP

(57) ABSTRACT

A method of emitting an anti-collision light output from an unmanned aerial vehicle includes emitting a plurality of light flashes of different colors within a flash duration interval, with the flash duration interval being at most 0.2 s; wherein the plurality of light flashes within the flash duration interval comprise at least one blue light flash and at least one yellow light flash or wherein the plurality of light flashes within the flash duration interval comprise at least one cyan light flash, at least one magenta light flash, and at least one yellow light flash.

20 Claims, 6 Drawing Sheets

(56) References Cited

U.S. PATENT DOCUMENTS

| | | | |
|---|---|---|---|
| 9,850,003 B2 | 12/2017 | Schoen et al. | |
| 10,472,090 B2 * | 11/2019 | Kessler | B64D 47/06 |
| 10,600,326 B2 * | 3/2020 | Kim | G08G 1/087 |
| 2003/0090391 A1 | 5/2003 | Philiben et al. | |
| 2017/0233099 A1 | 8/2017 | Kuhara et al. | |
| 2018/0312274 A1 | 11/2018 | Kessler et al. | |
| 2019/0049944 A1 | 2/2019 | Pohl | |

OTHER PUBLICATIONS

European Search Report for Application No. 19191996.8-1010, dated Jan. 22, 2020, 22 pages.

R. S Sliff: "Advisory Circular AC 20-74: Aircraft Position and Anticollision Light Measurements", Jul. 29, 1971, Retrieved from the Internet: URL:https://www.faa.gov/documentlibrary/media/Advisory_Circular/AC_2-_74.pdf [retrieved on Jan. 10, 2020]; 45 pages.

Washington Nn: "Advisory Circular AC 20-30B: Aircraft Position Light and Anticollision Light Installations", Jul. 20, 1981 (Jul. 20, 1981), Retrieved from the Internet: URL: http://www.faa.gov/documentlibrary/media/Advisory_Circular/AC_20-30B.pdf [Retrieved on Dec. 20, 2017], 13 pages.

\* cited by examiner

METHOD OF EMITTING AN ANTI-COLLISION LIGHT OUTPUT FROM AN UNMANNED AERIAL VEHICLE, ANTI-COLLISION LIGHT FOR AN UNMANNED AERIAL VEHICLE, AND UNMANNED AERIAL VEHICLE COMPRISING THE SAME

FOREIGN PRIORITY

This application claims priority to European Patent Application No. 19191996.8 filed Aug. 15, 2019, the entire contents of which is incorporated herein by reference.

BACKGROUND

The present invention is in the field of unmanned aerial vehicles (UAVs). In particular, the present invention is in the field of lighting systems for unmanned aerial vehicles.

BRIEF DESCRIPTION

Recently, the use of unmanned aerial vehicles/drones has increased significantly. Advances in the control and coordination of multiple rotors have made multicopters, in particular unmanned aerial vehicles (UAVs) of this kind, significantly more accessible and more reliable. A particularly popular kind of an unmanned aerial vehicle of the multicopter type is a quadrocopter. Various types of unmanned aerial vehicles have been developed, e.g. for recreational purposes, for carrying cameras, etc. Multicopters are further envisioned for the delivery of goods, for other kinds of courier services, and even for transporting people. With the envisioned increase in unmanned aerial vehicle traffic, flight safety is likely to become an increasing concern.

Accordingly, it would be beneficial to provide a method and a system for increasing the flight safety of unmanned aerial vehicles.

SUMMARY

Exemplary embodiments of the invention include a method of emitting an anti-collision light output from an unmanned aerial vehicle, comprising: emitting a plurality of light flashes of different colors within a flash duration interval, with the flash duration interval being at most 0.2 s; wherein the plurality of light flashes within the flash duration interval comprise at least one blue light flash and at least one yellow light flash.

Exemplary embodiments of the invention allow for providing an effective anti-collision warning signal, while allowing for a clear distinction between unmanned aerial vehicles and traditional, manned aerial vehicles and allowing for the anti-collision light output to be in conformity with existing anti-collision lighting standards and/or practices. The provision of blue and yellow light flashes allows for an effective distinction with respect to traditional, manned aerial vehicles, such as passenger aircraft, because traditional manned aerial vehicles generally only emit white light flashes, red light flashes, and white, red, and green continuous light outputs during flight. The emission of blue and yellow light flashes may be an effective signal to observers on the ground and/or observers in other aerial vehicles that the vehicle in question is an unmanned aerial vehicle. Also, blue and yellow light flashes may be suitable for drawing a high degree of attention to the unmanned aerial vehicle, thus providing an effective anti-collision warning signal.

The at least one blue light flash and the at least one yellow light flash are provided in a flash duration interval of at most 0.2 s. By being constrained to a total duration of at most 0.2 s, the at least one blue light flash and the at least one yellow light flash may be counted as a single light flash in accordance with particular aviation practices. Via color adding, the at least one blue light flash and the at least one yellow light flash may add up to yield a white color. While being perceived as blue and yellow light flashes by an observer, the blue and yellow light flashes may count as a single white light flash for aviation standards and/or practices. In this way, the anti-collision light output may be compliant with existing aviation standards and/or practices. Compliance with existing standards and/or practices may be achieved at the same time as providing for a clear distinction between unmanned aerial vehicles and traditional, manned aerial vehicles.

The method comprises emitting a plurality of light flashes of different colors within the flash duration interval. The at least one blue light flash and the at least one yellow light flash are emitted as subsequent light flashes. In other words, a sequence of blue and yellow light flashes is emitted during the flash duration interval. While a slight overlap between the blue and yellow light flashes may be allowed, significant portions of the blue and yellow light flashes do not have an overlap. In a particular embodiment, the blue and yellow light flashes do not overlap in time.

The plurality of light flashes within the flash duration interval comprise at least one blue light flash and at least one yellow light flash. The terms blue light flash and yellow light flash refer to bursts of light emission that are perceived as blueish/yellowish by a human observer. All color shades of blue and yellow, whose addition yields a color in the aviation white range, as defined by Federal Aviation Regulations (FAR) section 25.1397 (c) and/or as defined by SAE AS 8017-D, are encompassed by the terms blue light flash and yellow light flash.

The term unmanned aerial vehicle (UAV) encompasses all aerial vehicles that are capable and allowed to fly without a pilot on board. While the unmanned operation is the intended operation and the standard operation, the term unmanned aerial vehicle does not exclude the aerial vehicle to be designed to transport passengers at selected times. In particular, the unmanned aerial vehicle may be a so-called air taxi that is capable of transporting passengers, but that is unmanned in between instances of passenger transport.

The unmanned aerial vehicle may be a multicopter. In particular, the unmanned aerial vehicle may have a vehicle body and a plurality of rotors supported by the vehicle body. The unmanned aerial vehicle may comprise between 3 and 10 rotors, in particular between 4 and 8 rotors, further in particular 4 rotors or 8 rotors. The latter numbers of rotors refer to the aerial vehicle being a quadrocopter or an octocopter.

According to a further embodiment, the plurality of light flashes within the flash duration interval comprise exactly one blue light flash and exactly one yellow light flash. In this way, the flash duration interval may be split up between two light flashes, which in turn allows for the light flashes to be particularly well discernable by an observer. Also, observing two light flashes in a flash duration interval of at most 0.2 s may allow for a more pleasant perception by the user than seeing a higher number of light flashes in such a short time interval.

Exemplary embodiments of the invention further include a method of emitting an anti-collision light output from an unmanned aerial vehicle, comprising emitting a plurality of light flashes of different colors within a flash duration interval, with the flash duration interval being at most 0.2 s; wherein the plurality of light flashes within the flash duration interval comprise at least one cyan light flash, at least one magenta light flash, and at least one yellow light flash. The considerations laid out above with respect to emitting at least one blue light flash and at least one yellow light flash within the flash duration interval apply to the emission of at least one cyan light flash, at least one magenta light flash, and at least one yellow light flash in an analogous manner. Emitting cyan, magenta, and yellow light flashes is an alternative solution to emitting blue and yellow light flashes.

Via color adding, the at least one cyan light flash, the at least one magenta light flash, and the at least one yellow light flash may add up to yield a white color. While being perceived as cyan, magenta, and yellow light flashes by an observer, the cyan, magenta, and yellow light flashes may count as a single white light flash for aviation standards and/or practices.

The plurality of light flashes within the flash duration interval comprise at least one cyan light flash, at least one magenta light flash, and at least one yellow light flash. The terms cyan light flash, magenta light flash, and yellow light flash refer to bursts of light emission that are perceived as a mixture of blue and green/as a mixture of blue and red/as yellowish by a human observer. All color shades of cyan, magenta, and yellow, whose addition yields a color in the aviation white range, as defined by Federal Aviation Regulations (FAR) section 25.1397 (c) and/or as defined by SAE AS 8017-D, are encompassed by the terms cyan light flash, magenta light flash, and yellow light flash.

According to a further embodiment, the plurality of light flashes within the flash duration interval comprise exactly one cyan light flash, exactly one magenta light flash, and exactly one yellow light flash. In this way, the flash duration interval may be split up between three light flashes, which in turn allows for the light flashes to be particularly well discernable by an observer. Also, observing three light flashes in a flash duration interval of at most 0.2 s may allow for a more pleasant perception by the user than seeing a higher number of light flashes in such a short time interval.

According to a further embodiment, each of the plurality of the light flashes within the flash duration interval is at least 20 ms, in particular at least 50 ms. In other words, each of the plurality of light flashes has an individual duration of at least 20 ms, in particular of at least 50 ms. With the individual light flashes of different colors being at least 20 ms in duration, they are clearly discernable as individual flashes by a human observer. With the individual flashes of different colors having a duration of at least 50 ms, the light flashes of different colors are even more clearly discernable as individual light flashes by the observer and may also be more pleasant to the observer's eye. In this way, a good compromise between reliable signalling and a non-disruptive perception on the part of the observer may be achieved.

According to a further embodiment, each of the plurality of light flashes within the flash duration interval is at most 100 ms, in particular at most 70 ms. In other words, each of the plurality of light flashes may have an individual duration of at most 100 ms, in particular of at most 70 ms.

According to a further embodiment, the plurality of light flashes within the flash duration interval are of substantially equal length. In this way, the two/three colors within the flash duration interval are perceived as having equal importance. This in turn may allow for an intuitive and widely accepted two-color or three-color anti-collision warning signal.

According to a further embodiment, the method comprises repeating the step of emitting a plurality of light flashes of different colors within a flash duration interval. In other words, the method may be carried out over a plurality of flash duration intervals, with a plurality of light flashes of different colors being emitted in each of the flash duration intervals, respectively. The flash duration intervals may be separated by time periods of no or substantially no light emission. The time periods of separation may be at least 0.2 s in duration. For example, the time periods of separation may be between 0.4 s and 1.5 s in duration.

In a particular embodiment, the step of emitting a plurality of light flashes of different colors within a flash duration interval may be repeated as long as the unmanned aerial vehicle is in the air. In this way, a continuous anti-collision warning signal may be output to the observers of the unmanned aerial vehicle, such as to persons on the ground and/or pilots of other aerial vehicles.

According to a further embodiment, the step of emitting a plurality of light flashes of different colors within a flash duration interval is repeated between 40 times and 100 times per minute. In this way, the anti-collision light output may be in compliance with Federal Aviation Regulations (FAR) section 25.1401 (c) in terms of the number of flashes. In this context, it is pointed out again that the plurality of light flashes of different colors within the flash duration interval of at most 0.2 s may be counted as one flash for the purpose of FAR compliance.

According to a further embodiment, the method comprises emitting white light flashes, in case one or more human passengers are aboard the unmanned aerial vehicle. The white light flashes are emitted instead of the light flashes of different colors, as described above. In other words, when white light flashes are emitted, above described light flashes of different colors are no longer emitted. In this way, the method may adapt the anti-collision warning signal, depending on whether the unmanned aerial vehicle is in a regular unmanned operation mode or whether the unmanned aerial vehicle is temporarily transporting passengers, before going back to an unmanned operation. In this way, the method may adapt the anti-collision warning signal to the current operating mode of an air taxi or similar aerial vehicle. The emission of white light flashes is in accordance with traditional anti-collision light outputs, as for example employed by traditional passenger aircraft.

Further exemplary embodiments of the invention include an anti-collision light for an unmanned aerial vehicle, comprising a plurality of light sources of different colors; and a control unit coupled to the plurality of light sources, wherein the control unit is configured to control the plurality of light sources to emit a plurality of light flashes of different colors within a flash duration interval of at most 0.2 s, and wherein the control unit is configured to control the plurality of light sources to emit at least one blue light flash and at least one yellow light flash within a flash duration interval and/or wherein the control unit is configured to control the plurality of light sources to emit at least one cyan light flash, at least one magenta light flash, and at least one yellow light flash within a flash duration interval. The additional features, modifications and effects, as described above with respect to the method of emitting an anti-collision light output from an unmanned aerial vehicle, apply to the anti-collision light for an unmanned aerial vehicle in an analogous manner.

According to a further embodiment, the plurality of light sources comprise a blue light source and a yellow light source, and/or the plurality of light sources comprise a cyan light source, a blue light source, a red light source, and a yellow light source. In this way, the blue, yellow, and cyan light flashes may be conveniently provided via switching the respective dedicated light sources on/off. Also, the magenta light flashes may be conveniently generated by switching the blue and red light sources simultaneously on/off. It is also possible that the plurality of light sources comprise a red light source, a green light source and a blue light source. Via color mixing of red, green, and blue light, light flashes of blue, yellow, cyan, and magenta colors may also be achieved.

According to a further embodiment, the plurality of light sources comprise a white light source. The white light source may be provided in addition to the colored light sources. The provision of a white light source allows for a convenient way of emitting white light flashes, which may be desired for indicating a temporary transport of human passengers, as discussed above.

According to a further embodiment, the plurality of light sources are a plurality of LEDs. With LEDs being small light sources and having comparably low power demands, a particularly compact implementation of the anti-collision light may be achieved. This may be particularly desirable in the limited space of an unmanned aerial vehicle. Also, LEDs are highly reliable and have quick response times, when being switched on/off by the control unit for producing the plurality of light flashes of different colors.

Exemplary embodiments of the invention further include an unmanned aerial vehicle comprising at least one anti-collision light, as described in any of the embodiments above. The additional features, modifications and effects, as described above with respect to the method of emitting an anti-collision light output from an unmanned aerial vehicle and with respect to an anti-collision light for an unmanned aerial vehicle, apply to the unmanned aerial vehicle in an analogous manner.

According to a further embodiment, the unmanned aerial vehicle is of a multi-copter type. In particular, the unmanned aerial vehicle may have a vehicle body and a plurality of rotors supported by the vehicle body.

According to a further embodiment, the unmanned aerial vehicle comprises an upper anti-collision light, as described in any of the embodiments above, arranged on an upper portion of the unmanned aerial vehicle. In this way, the upper anti-collision light is well-positioned to provide an anti-collision light output in the upper hemisphere above the horizontal plane of the unmanned aerial vehicle. In a particular embodiment, the upper anti-collision light is arranged on an upper portion of a vehicle body of the unmanned aerial vehicle.

According to a further embodiment, the unmanned aerial vehicle comprises a lower anti-collision light, as described in any of the embodiments above, arranged on a lower portion of the unmanned aerial vehicle. In this way, the lower anti-collision light is well-positioned to provide an anti-collision light output in the lower hemisphere below the horizontal plane of the unmanned aerial vehicle. In a particular embodiment, the lower anti-collision light is arranged on an lower portion of a vehicle body of the unmanned aerial vehicle.

According to a further embodiment, the upper anti-collision light and/or the lower anti-collision light in operation provide an anti-collision light output having at least the following light intensities: 400 cd in a first angular range between 0° and 5° with respect to a horizontal plane through the unmanned aerial vehicle; 240 cd in a second angular range between 5° and 10° with respect to the horizontal plane; 80 cd in a third angular range between 10° and 20° with respect to the horizontal plane; 40 cd in a fourth angular range between 20° and 30° with respect to the horizontal plane; and 20 cd in a fifth angular range between 30° and 75° with respect to the horizontal plane. In this way, the light intensities of the upper anti-collision light and/or the lower anti-collision light may satisfy the minimum requirements, as laid out in Federal Aviation Regulations (FAR) section 25.1401 (f). The anti-collision light(s) may therefore satisfy the FAR requirements for anti-collision lights both in terms of color and light intensity, while providing a clear indication of an unmanned aerial vehicle via the two-color or three-color light flashes within the flash duration interval.

BRIEF DESCRIPTION OF THE DRAWINGS

Further exemplary embodiments of the invention are described below with reference to the enclosed drawings, wherein.

DETAILED DESCRIPTION

Figure 1:
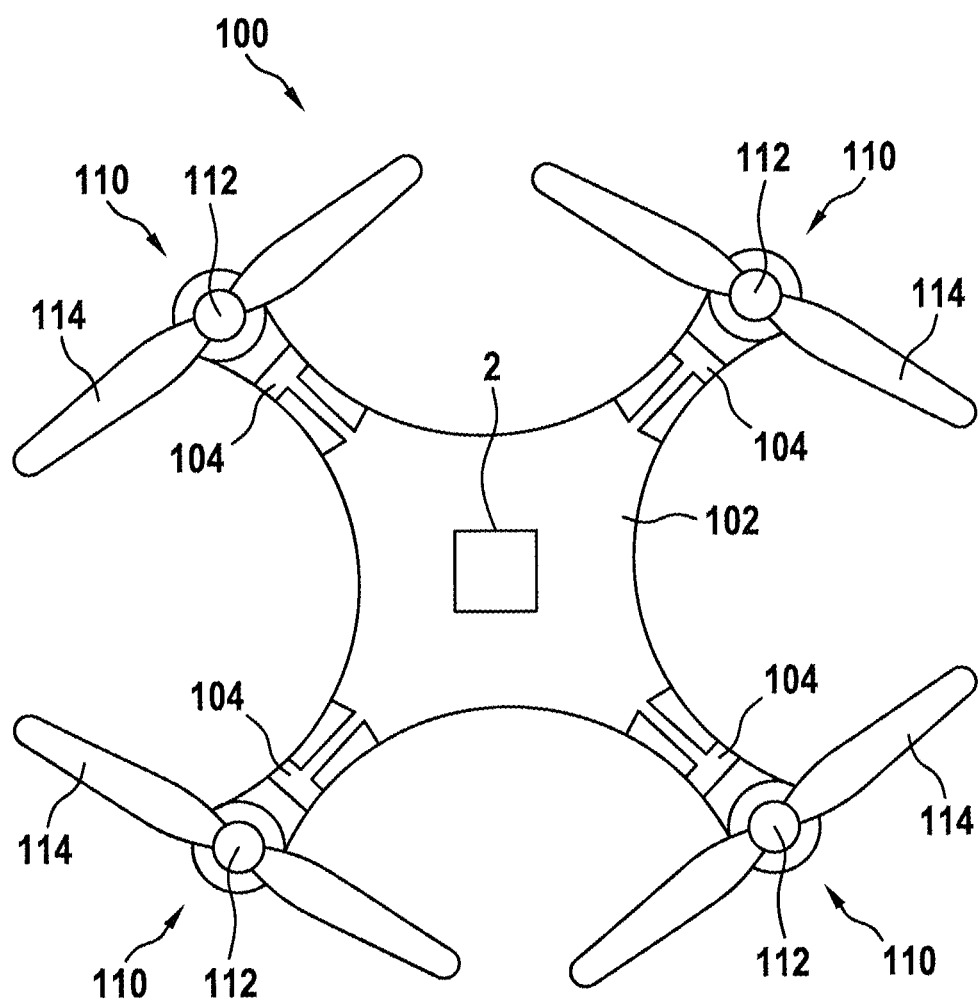
FIG. 1 shows an unmanned aerial vehicle in accordance with an exemplary embodiment of the invention in a schematic top view.

FIG. 1 shows an unmanned aerial vehicle 100 in accordance with an exemplary embodiment of the invention in a schematic top view. The unmanned aerial vehicle 100 is a multicopter. In particular, the unmanned aerial vehicle 100 is a quadrocopter in the exemplary embodiment of FIG. 1, i.e. it has four rotors. The unmanned aerial vehicle may have a smaller or greater number of rotors, such as eight rotors, thus operating as an octocopter. The unmanned aerial vehicle may be an unmanned aerial vehicle at all times or may be a generally unmanned aerial vehicle, capable of temporarily transporting human passengers, such as an air taxi. The unmanned aerial vehicle may be remote controlled or may be autonomous.

The unmanned aerial vehicle 100 has a vehicle body 102. The vehicle body 102 may be configured for carrying utilities or delivery goods or any other kind of goods to be carried. The vehicle body 102 comprises four rotor support arms 104. Each of the four rotor support arms 104 supports a rotor 110.

Each of the four rotors 110 has a rotor hub 112 and two rotor blades 114. In the exemplary embodiment of FIG. 1, the two rotor blades 114 of each rotor 110 are separate elements, each element individually mounted to the rotor hub 112. The two rotor blades 114 of each rotor 110 may also be formed as an integrated structure and may be attached to the rotor hub 112 as a single integrated element. It is pointed out that the rotors 110 may have larger numbers of rotor blades as well.

In operation, the rotor blades 114 rotate around the rotor hub 112 and provide lift to the unmanned aerial vehicle 100. The rotating speed of the rotor blades 114 of the rotors 110 are controlled by a flight control unit of the unmanned aerial vehicle 100. By adapting the relative rotating speeds of the four rotors 110, the unmanned aerial vehicle 100 is steerable and can be flown into desired flight directions. The mechanics of flying and steering a multicopter are known to the skilled person.

An anti-collision light 2 is mounted to the vehicle body 102, in particular to an upper central portion of the vehicle body 102. In FIG. 1, the anti-collision light 2 is schematically shown as a structure having a rectangular outline in the depicted schematic top view. A further anti-collision light 2 may be mounted to a lower central portion of the vehicle body 102. The components of the anti-collision light 2 and its operation will be described below.

Figure 2:
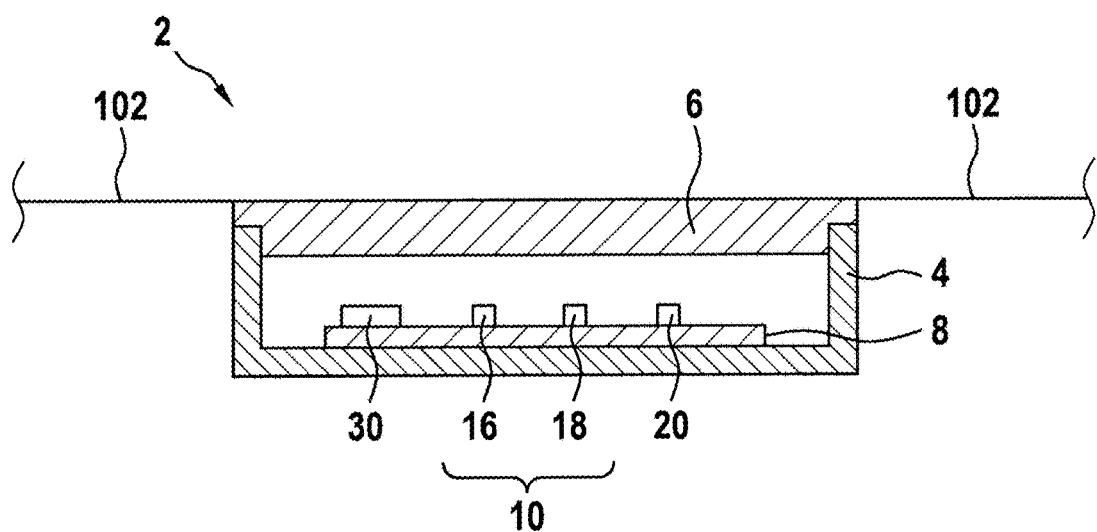
FIG. 2 shows an anti-collision light in accordance with an exemplary embodiment of the invention in a schematic cross-sectional view.

FIG. 2 shows an anti-collision light 2 in accordance with an exemplary embodiment of the invention in a schematic cross-sectional view. The anti-collision light 2 is embedded into the vehicle body 102 of an unmanned aerial vehicle in accordance with exemplary embodiments of the invention. The anti-collision light may also extend from the vehicle body 102, it may for example be a dome-shaped structure extending from the vehicle body 102. For clarity of illustration, only a small portion of the vehicle body 102 is shown in FIG. 2.

The anti-collision light 2 comprises a housing 4 and a lens cover 6. The housing 4 and the lens cover 6 define an inner space of the anti-collision light 2. A circuit board 8, such as a printed circuit board, is arranged in the inner space of the anti-collision light 2. A plurality of light sources of different colors, jointly referred to with reference numeral 10, are arranged on the circuit board 8. In the exemplary embodiment of FIG. 2, the plurality of light sources of different colors 10 comprise a blue light source 16 and a yellow light source 18. Further, a white light source 20 is arranged on the circuit board 18 in the exemplary embodiment of FIG. 2. The white light source 20 may also be omitted. In the exemplary embodiment of FIG. 2, the blue light source 16, the yellow light source 18, and the white light source 20 are a blue LED, a yellow LED, and a white LED.

The light sources may be arranged in row-like configuration, as illustrated in FIG. 2, or in a matrix configuration or in any other suitable configuration. The light sources may emit their light output directly towards the lens cover 6 and out of the anti-collision light 2. They may also be associated with one or more optical elements, such as one or more reflectors and/or one or more lenses and/or one or more shutters, for shaping the light intensity distribution of the light output. The lens cover 6 is transparent for allowing the light from the light sources 16, 18, 20 to exit the anti-collision light 2.

The anti-collision light 2 further comprises a control unit 30. The control unit 30 is also arranged on the circuit board 8. The control unit 30 is coupled to the blue light source 16, the yellow light source 18, and the white light source 20 via wired connections of the circuit board 8. The control unit 30 is configured to control the blue light source 16, the yellow light source 18, and the white light source 20. In particular, the control unit 30 is configured to switch the blue light source 16, the yellow light source 18, and the white light source 20 on/off. The control unit 30 may also be arranged outside of the inner space between the housing 4 and the lens cover 6. However, as the control unit 30 is configured to control the light sources of the anti-collision light 2, it is defined as part of the anti-collision light 2, irrespective of its location.

The control unit 30 of the anti-collision light 2 is coupled to a flight control unit of the unmanned aerial vehicle. The control unit 30 receives information about the current operating state of the unmanned aerial vehicle from the flight control unit of the unmanned aerial vehicle. For example, the control unit 30 may receive information about whether the unmanned aerial vehicle is currently in flight or on the ground.

Figure 3:
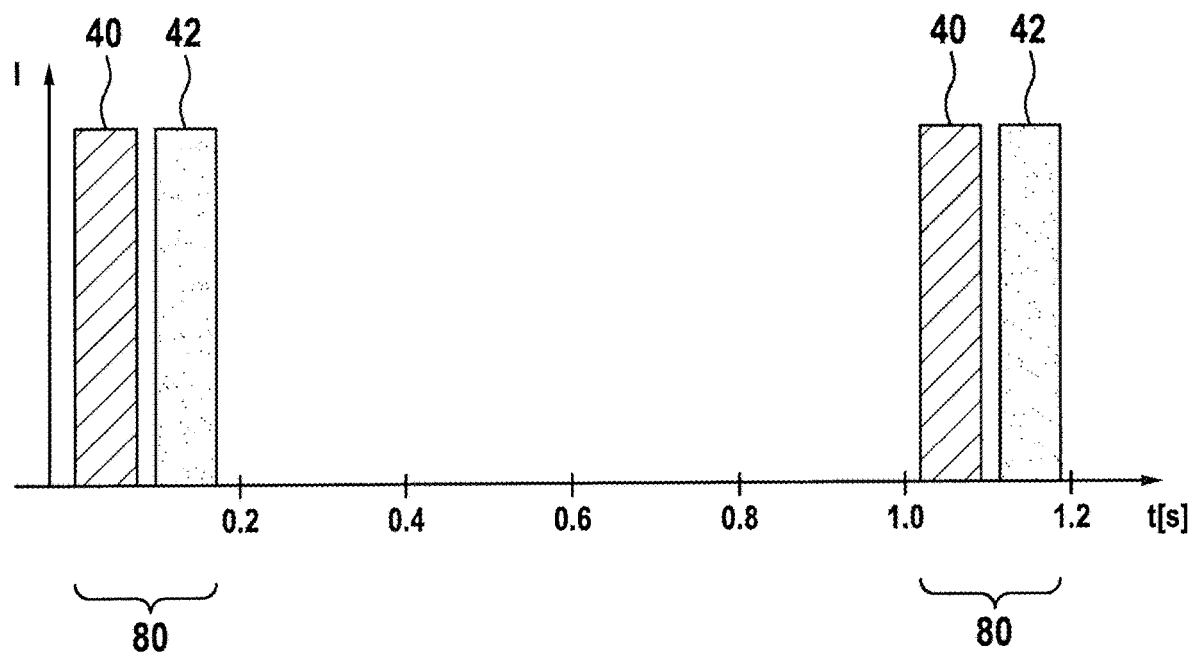
FIG. 3 shows a flash sequence as emitted in operation by the anti-collision light of FIG. 2.

The operation of the anti-collision light 2 of FIG. 2 is now described with respect to FIG. 3. In FIG. 3, a sequence of light flashes is shown, resulting from the switching of the light sources of the anti-collision light 2 of FIG. 2 over time. FIG. 3 illustrates the sequence of light flashes for an operating situation when the unmanned aerial vehicle is in the air. In other words, the sequence of light flashes of FIG. 3 is based on the assumption that the control unit 30 is aware of the unmanned aerial vehicle being in the air and controls the plurality of light sources of different colors 10 in accordance with this awareness.

Between t=0 s and t=0.2 s, the anti-collision light emits two light flashes of different colors, namely a blue light flash 40 and a yellow light flash 42. In the exemplary embodiment of FIGS. 2 and 3, the blue light flash 40 and the yellow light flash 42 do not overlap, are of substantially the same length, and have substantially the same intensity. In particular, the blue light flash 40 may be emitted between t=0.01 s and t=0.09 s, and the yellow light flash 42 may be emitted between t=0.11 s and t=0.19 s. In this way, both of the blue light flash 40 and the yellow light flash 42 are 80 ms in duration. It is pointed out that it is also possible that the blue light flash 40 and the yellow light flash 42 have different durations and/or different relative light intensities.

In the exemplary embodiment of FIGS. 2 and 3, the blue light flash 40 is generated by switching the blue light source 16 on between t=0.01 s and t=0.09 s, and the yellow light flash 42 is generated by switching the yellow light source 18 on between t=0.11 s and t=0.19 s.

The time frame between t=0 s and t=0.2 s is also referred to as a flash duration interval 80. Accordingly, the blue light flash 40 and the yellow light flash 42 are emitted within the flash duration interval 80. In the exemplary embodiment of FIGS. 2 and 3, the flash duration interval 80 is 0.2 s long. It is also possible that the flash duration interval 80 is shorter.

The time frame between t=0 s and t=0.2 s is referred to as a flash duration interval 80, because the individual blue and yellow light flashes within the flash duration interval 80 may be counted as a single flash according to particular standards/practices in the field of aircraft lighting. For example, Aerospace Standard AS8017-D says that multiple flashes may be counted as a single flash for the purpose of that standard, provided they are within a time frame of 0.2 s. In this way, while being clearly discernible as two individual flashes of different colors for an observer, the blue and yellow light flashes 40, 42 between t=0 s and t=0.2 s may be counted as a single flash for the purpose of particular standards/practices in the field of aircraft lighting.

Besides being counted as a single flash, the blue light flash 40 and the yellow light flash 42 between t=0 s and t=0.2 s may be jointly considered as a white light flash. In addition to being counted as a single flash, the colors within the flash duration interval 80 may be added. With blue and yellow adding up to white according to color addition rules, the overall color emitted within the flash duration interval 80 may be considered to be white. This approach may be thought of as pointing a photo camera towards the anti-collision light 2, opening the shutter at t=0 s, and setting the camera shutter time to 0.2 s. In mathematical terms, the approach may be thought of as integrating the light output from the anti-collision light 2 over the flash duration interval 80. Such an integration may take into account different light intensities and different lengths of the individual light flashes within the flash duration interval.

In this way, an anti-collision light output may be achieved that is discernible as a sequence of flashes of different colors to an observer, while counting as a single white flash for particular standards/practices in the field of aircraft lighting. A clear distinction between unmanned aerial vehicles and traditional, manned aircraft may be achieved, while maintaining compliance with existing standards/practices for anti-collision lights.

The anti-collision light 2 is configured to repeat the emission of a blue light flash 40 and a yellow light flash 42 within a respective flash duration interval 80, as long as the unmanned aerial vehicle is in the air. This is illustrated in FIG. 3 by another pair of blue and yellow light flashes 40, 42 between t=1 s and t=1.2 s. The given pattern of blue and yellow light flashes 40, 42 within according flash duration intervals 80 and of light emission breaks of about 0.8 s between the flash duration intervals 80 may be continued, as long as the unmanned aerial vehicle is in the air.

It is pointed out that t=0 s is arbitrarily defined for illustrating the exemplary sequence of light flashes of different colors, as emitted by the exemplary anti-collision light 2. The starting point t=0 s may also be defined somewhere between two flash duration intervals 80 or at some point in time before the unmanned aerial vehicle takes off.

It is further pointed out that the light emission breaks between the flash duration intervals 80 may be shorter or longer than the depicted about 0.8 s. For example, the breaks may be between 0.4 s and 1.5 s long.

In case the unmanned aerial vehicle in question is an air taxi, capable of transporting passengers, the described flash pattern of blue and yellow flashes may be emitted when no passengers are aboard. When one or more passengers are aboard, the control unit 30 may control the blue light source 16 and the yellow light source 18 to remain off. Instead, the control unit 30 may control the white light source 20 to emit white light flashes. In this way, the anti-collision light output from the anti-collision light 2 may resemble the traditional white strobe anti-collision lighting, as expected from traditional passenger aircraft, thus indicating a momentary state of passenger transport.

Figure 4:
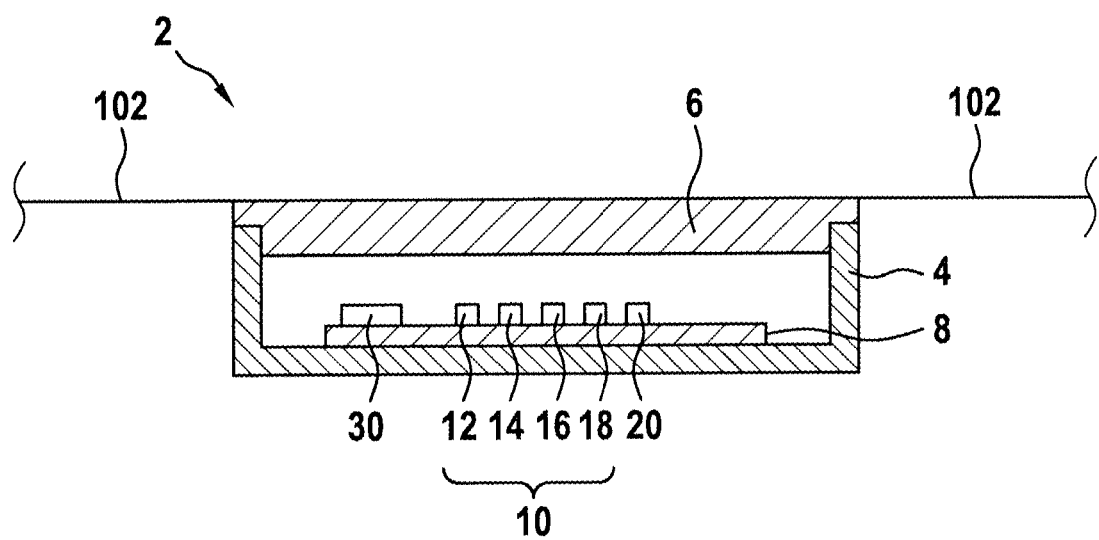
FIG. 4 shows an anti-collision light in accordance with another exemplary embodiment of the invention in a schematic cross-sectional view.

FIG. 4 shows an anti-collision light 2 in accordance with another exemplary embodiment of the invention in a schematic cross-sectional view. The anti-collision light 2 of FIG. 4 is similar to the anti-collision light 2 of FIG. 2. Reference is made to the description of FIG. 2 above, with the differences between the anti-collision light 2 of FIG. 4 and the anti-collision light 2 of FIG. 2 being described as follows.

In the exemplary anti-collision light 2 of FIG. 4, the plurality of light sources of different colors 10 comprise a cyan light source 12, a red light source 14, a blue light source 16, and a yellow light source 18. In the exemplary embodiment of FIG. 4, the cyan light source 12, the red light source 14, the blue light source 16, the yellow light source 18, and the white light source 20 are a cyan LED, a red LED, a blue LED, a yellow LED, and a white LED. The control unit 30 is configured to control the cyan light source 12, the red light source 14, the blue light source 16, the yellow light source 18, and the white light source 20. In particular, the control unit 30 is configured to switch the cyan light source 12, the red light source 14, the blue light source 16, the yellow light source 18, and the white light source 20 on/off.

Figure 5:
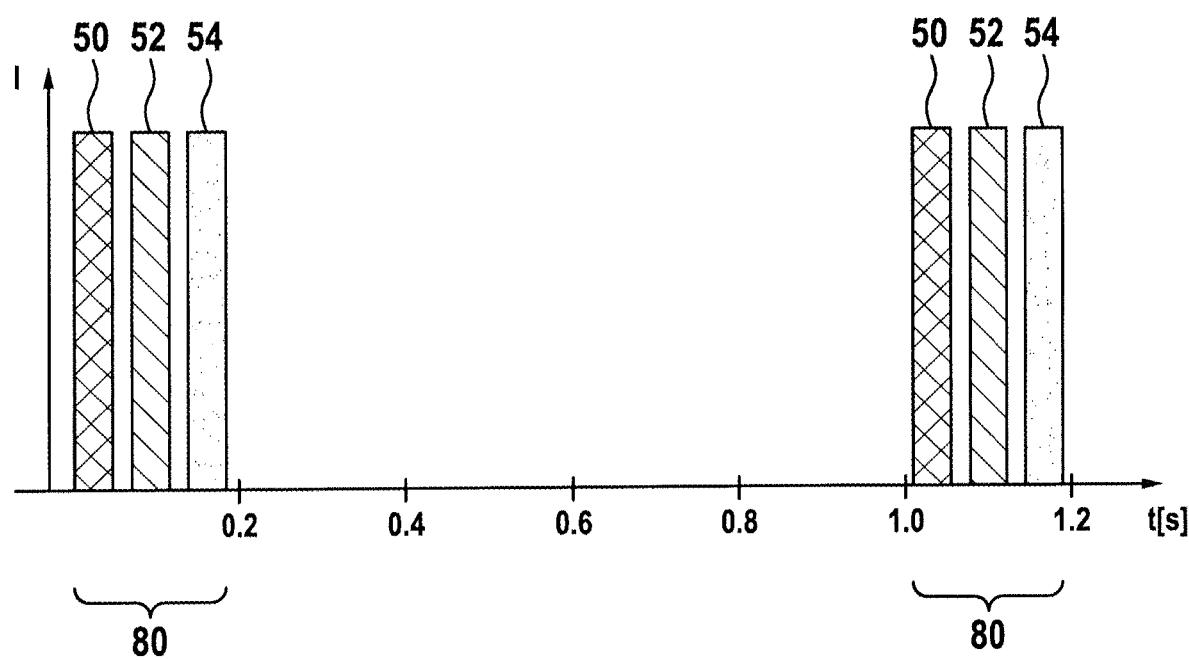
FIG. 5 shows a flash sequence as emitted in operation by the anti-collision light of FIG. 4.

The operation of the anti-collision light 2 of FIG. 4 is now described with respect to FIG. 5. In FIG. 5, a sequence of light flashes is shown, resulting from the switching of the light sources of the anti-collision light 2 of FIG. 4 over time. FIG. 5 illustrates the sequence of light flashes for an operating situation when the unmanned aerial vehicle is in the air. In other words, the sequence of light flashes of FIG. 5 is based on the assumption that the control unit 30 is aware of the unmanned aerial vehicle being in the air and controls the plurality of light sources of different colors 10 in accordance with this awareness.

As compared to the sequence of light flashes of FIG. 3, the sequence of light flashes of FIG. 5 has three light flashes of different colors within each flash duration interval 80. In particular, within each flash duration interval 80, there are a cyan light flash 50, a magenta light flash 52, and a yellow light flash 54. In the exemplary embodiment of FIGS. 4 and 5, the cyan light flash 50, the magenta light flash 52, and the yellow light flash 54 do not overlap, are of substantially the same length, and have substantially the same intensity. In particular, in the flash duration interval from t=0 s to t=0.2 s, the cyan light flash 50 may be emitted between t=0.01 s and t=0.06 s, the magenta light flash may be emitted between t=0.07 s and t=0.12 s, and the yellow light flash 54 may be emitted between t=0.13 s and t=0.18 s. In this way, all three of the cyan light flash 50, the magenta light flash 52, and the yellow light flash 54 are 50 ms in duration. It is pointed out that it is also possible that the cyan light flash 50, the magenta light flash 52, and the yellow light flash 54 have different durations and/or different relative light intensities.

In the exemplary embodiment of FIGS. 4 and 5, the cyan light flash 50 is generated by switching the cyan light source 12 on, the magenta light flash 52 is generated by switching the red light source 14 and the blue light source 16 on, and the yellow light flash 54 is generated by switching the yellow light source 18 on.

The colors cyan, magenta, and yellow also add up to white. With the cyan light flash 50, the magenta light flash 52, and the yellow light flash 54 being provided within the flash duration interval 80, the combination of the cyan light flash 50, the magenta light flash 52, and the yellow light flash 54 may be considered a single white light flash according to particular standards/practices in the field of aircraft lighting.

In this way, the flash sequence of FIG. 5 provides an alternative solution for achieving an anti-collision light output that is discernible as a sequence of flashes of different colors to an observer, while counting as a single white flash for particular standards/practices in the field of aircraft lighting. A clear distinction between unmanned aerial vehicles and traditional, manned aircraft may be achieved, while maintaining compliance with existing standards/practices for anti-collision lights.

Figure 6:
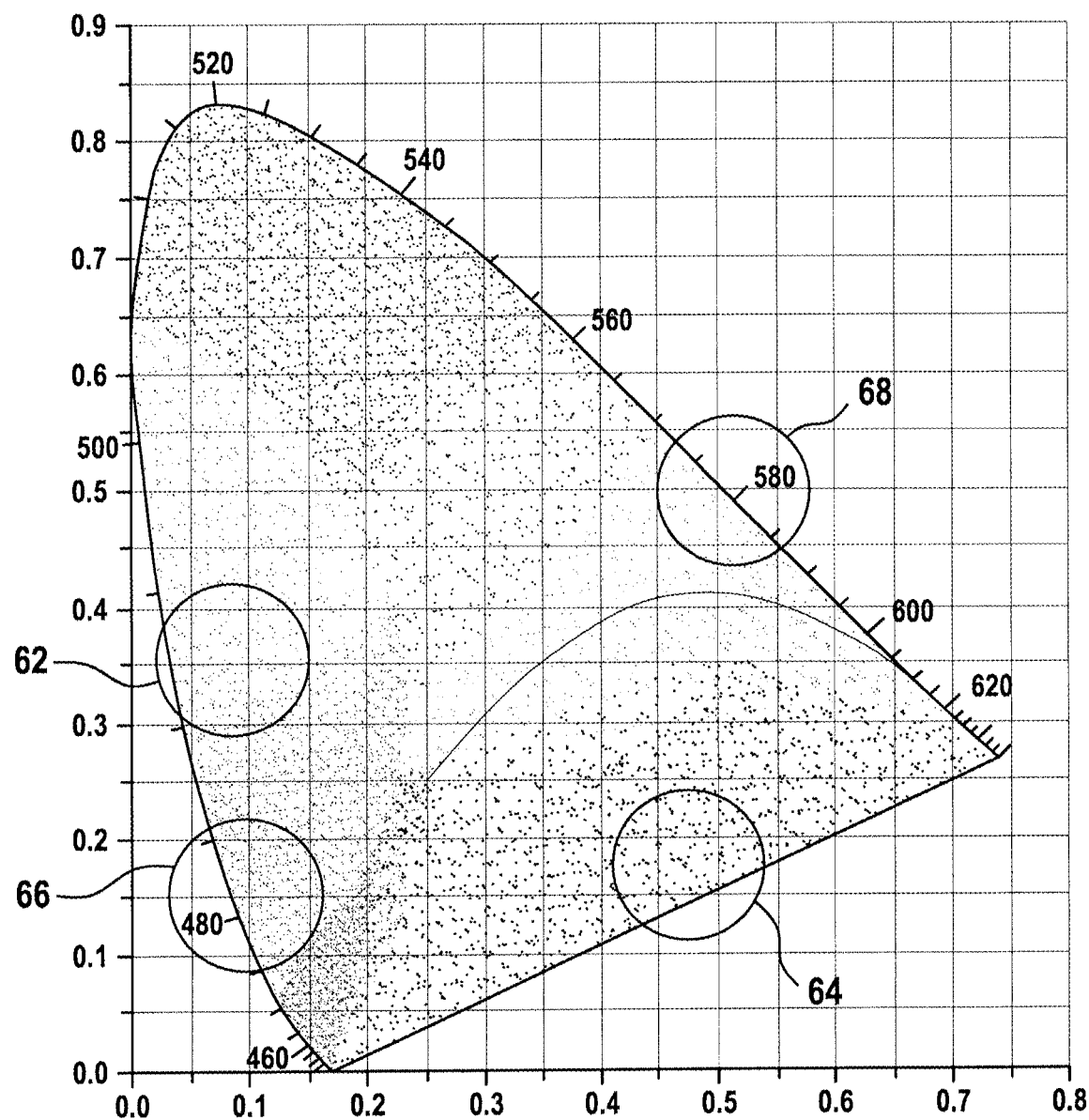
FIG. 6 indicates exemplary color ranges, as used by methods in accordance with exemplary embodiments of the invention, in a 1931 CIE chromaticity diagram.
Figure 7:
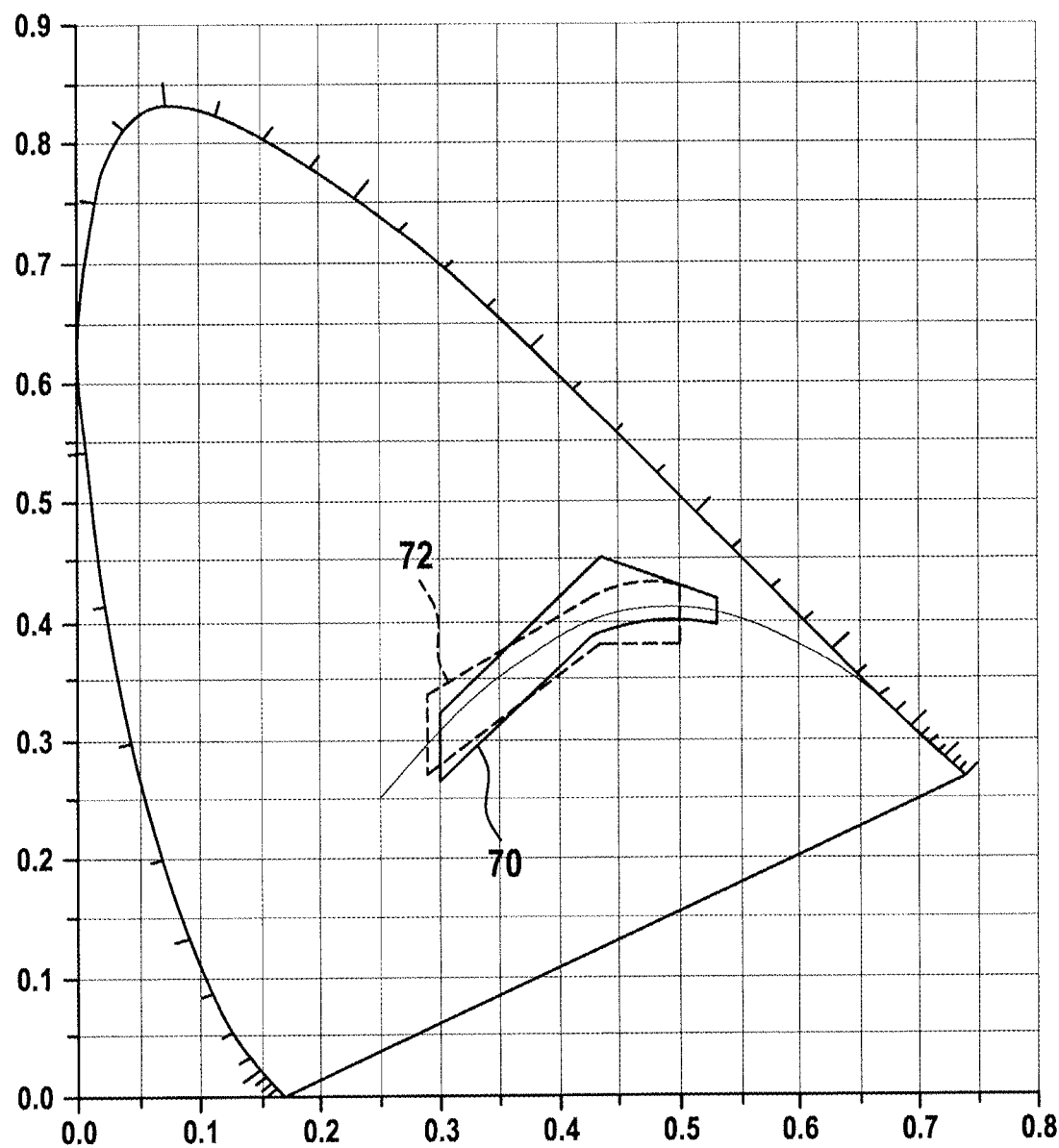
FIG. 7 indicates aviation white in the 1931 CIE chromaticity diagram.

FIGS. 6 and 7 illustrate the concept of color addition, as made use of in the anti-collision light output of exemplary embodiments of the present invention, in the framework of the 1931 CIE chromaticity diagram. FIG. 6 is a grey-scale representation of said diagram. While the diagram is per definition in color, the grey-scale allows for illustrating the concept of color addition. Also, the 1931 CIE chromaticity diagram is readily available to the public, such that the explanations given herein can be easily read in conjunction with a color version of the 1931 CIE chromaticity diagram. A color version of the 1931 CIE chromaticity diagram is incorporated herein by reference.

FIG. 7 indicates a polygon 70 that represents the definition of aviation white light, as given by the Federal Aviation Regulations (FAR), and a polygon 72 that represents the definition of aviation white light, as given by SAE AS8017-D. As described above, exemplary embodiments of the present invention rely on using colors for the plurality of light flashes within the flash duration interval that add up to white. In the context of FIG. 7, this approach means that the colors used within a flash duration interval may add up to a shade of white, contained within polygon 70 and/or polygon 72.

When looking at FIG. 6 in conjunction with FIG. 7, it can be seen that the adding of a blueish color, as highly schematically indicated by circle 66, and a yellowish color, as highly schematically indicated by circle 68, may lead to a shade of white within polygon 70 and/or polygon 72. In this context, the addition of colors yields a color shade that is on the connecting line between the shade of blue used and the shade of yellow used.

Similarly, when looking at FIG. 6 in conjunction with FIG. 7, it can be seen that the adding of a cyan color, as highly schematically indicated by circle 62, and a magenta color, as highly schematically indicated by circle 64, and a yellowish color, as highly schematically indicated by circle 68, may lead to a shade of white within polygon 70 and/or polygon 72. In this context, the addition of colors yields a color shade that is within the triangle given by the connection lines between the shade of cyan used, the shade of magenta used, and the shade of yellow used.

It is pointed out that above described color adding may yield a color shade within the definition of aviation white, without using red or green colors. In this way, none of the plurality of light flashes within the flash duration interval is green or red, thus staying away from colors that are reserved for navigation lights. Instead, the desired color adding may be achieved with colors that have no specified meanings on airborne aircraft, as of now. In this way, the confusion with other aircraft signalling may be kept low or may even be prevented.

Figure 8A:
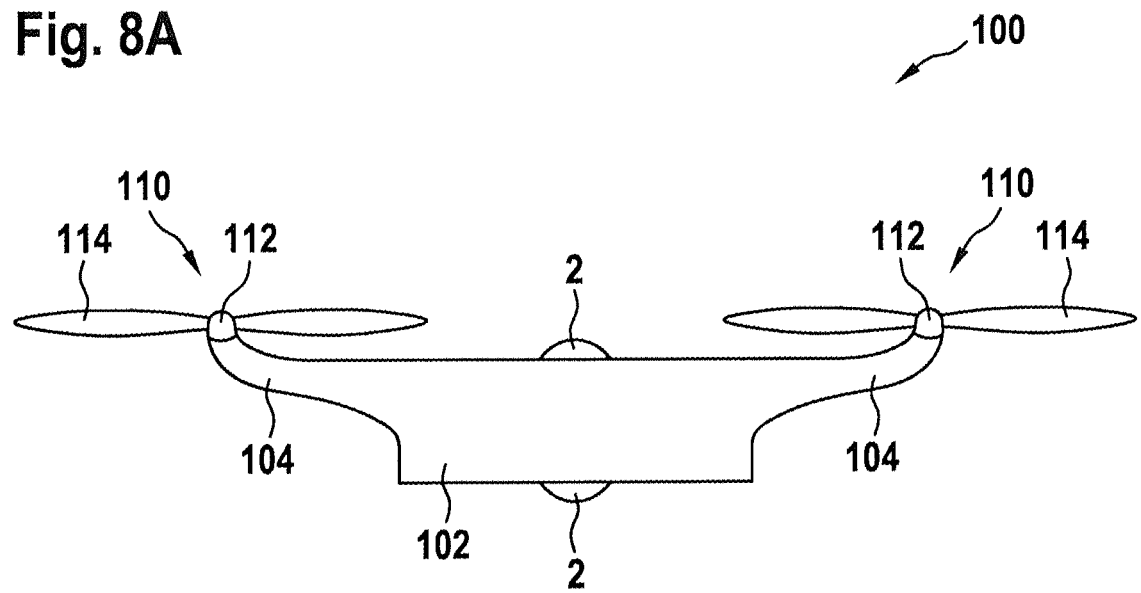
FIG. 8A shows an unmanned aerial vehicle in accordance with an exemplary embodiment of the invention in a schematic side view.

FIG. 8A shows an unmanned aerial vehicle 100 in accordance with an exemplary embodiment of the invention in a schematic side view. The unmanned aerial vehicle 100 may be the unmanned aerial vehicle 100 of FIG. 1, depicted in a side view. Accordingly, the unmanned aerial vehicle 100 of FIG. 8 is a quadrocopter, with two of the rotors being shown in the side view of FIG. 8. With respect to the description of the vehicle body 102, the rotor support arms 104, and the rotors 110, having rotor hubs 112 and rotor blades 114, reference is made to the description of FIG. 1 above.

The unmanned aerial vehicle 100 of FIG. 8 has an upper anti-collision light 2, mounted to an upper portion of the vehicle body 102, and a lower anti-collision light 2, mounted to a lower portion of the vehicle body 102. In the exemplary embodiment of FIG. 8, the upper and lower anti-collision lights 2 extend upwards/downwards from the upper/lower portion of the vehicle body 102. In particular, each of the upper and lower anti-collision lights 2 has a dome-shaped lens cover, which extends above/beyond the vehicle body 102. The light sources, control unit, and other components may be analogous to any of the embodiments described above with respect to FIGS. 2 and 4.

As compared to the anti-collision lights 2 of FIGS. 2 and 4, which are embedded into the vehicle body, the extension above/beyond the vehicle body 102 allows for an elevated positioning of the light sources with respect to the vehicle body and thus for a less complex directing of light into a wide range of directions, in particular a less complex directing of light into or close to the horizontal plane. It is pointed out that anti-collision lights in accordance with exemplary embodiments of the invention may alternatively or additionally be provided at other positions of the unmanned aerial vehicle, such as on the side faces of the vehicle body and/or on the rotor support arms.

Figure 8B:
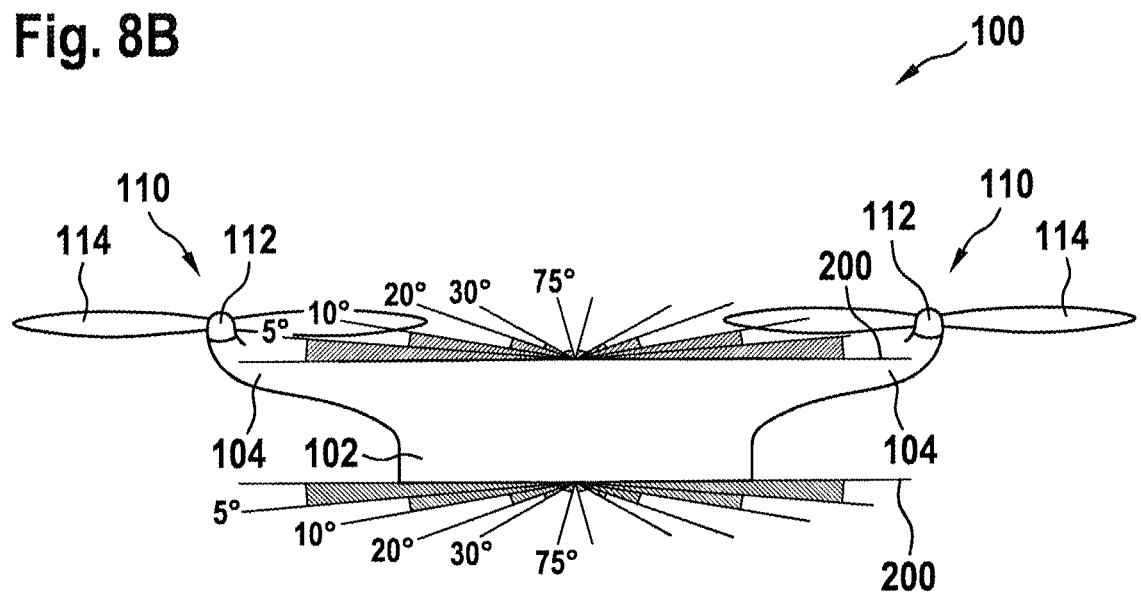
FIG. 8B shows light intensities, as emitted by anti-collision lights in accordance with an exemplary embodiment of the invention, when mounted to the unmanned aerial vehicle.

FIG. 8B illustrates light intensity distributions that reflect the requirements of Federal Aviation Regulations (FAR) section 25.1401. The light intensity distributions are shown as angular distributions with respect to horizontal planes 200. In particular, the light intensity distributions are shown in a vertical cross-sectional plane that is orthogonal to a horizontal plane through the unmanned aerial vehicle 100. As the FAR requirements are given as a rotationally symmetric distribution, i.e. as a distribution that is identical in all viewing directions from the anti-collision light, the shown light intensity distributions would look the same in all vertical cross-sections through the center of the upper anti-collision light and through the center of the lower anti-collision light, respectively.

The depicted light intensity distribution of FIG. 8B is as follows. A light intensity of 400 cd is indicated for an angular range of between 0° and 5° with respect to the horizontal plane 200. A light intensity of 240 cd is indicated in an angular range of between 5° and 10° with respect to the horizontal plane 200. A light intensity of 80 cd is indicated in an angular range between 10° and 20° with respect to the horizontal plane 200. A light intensity of 40 cd is indicated in an angular range of between 20° and 30° with respect to the horizontal plane 200. A light intensity of 20 cd is indicated in an angular range of between 30° and 75° with respect to the horizontal plane 200. The light intensity values, shown as angular sectors in FIG. 8B, represent minimum light intensity values, as spelled out by the FAR.

Anti-collision lights in accordance with exemplary embodiments of the invention may have anti-collision light outputs that fulfill these FAR requirements. It is possible that one anti-collision light in accordance with an exemplary embodiment of the invention has an anti-collision light output that fulfills the FAR requirements for the upper hemisphere or the lower hemisphere. It is also possible that multiple anti-collision lights are arranged around the perimeter of the unmanned aerial vehicle and jointly fulfill the FAR requirements for both the upper hemisphere and the lower hemisphere. The expressions of the anti-collision light output(s) fulfilling the FAR requirements or satisfying the FAR requirements or being in accordance with the FAR requirements is to be understood as the anti-collision light output(s) reaching or exceeding the minimum light intensity values, as described above.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

What is claimed is:

1. A method of emitting an anti-collision light output from an unmanned aerial vehicle, comprising:
    emitting a plurality of light flashes of different colors within a flash duration interval, with the flash duration interval being at most 0.2 s;
    wherein the plurality of light flashes within the flash duration interval comprise at least one blue light flash and at least one yellow light flash.

2. The method according to claim 1, wherein the plurality of light flashes within the flash duration interval comprise exactly one blue light flash and exactly one yellow light flash.

3. The method according claim 1, wherein each of the plurality of light flashes within the flash duration interval is at least 20 ms.

4. The method according to claim 1, wherein the plurality of light flashes within the flash duration interval are of substantially equal length.

5. The method according to claim 1, further comprising:
    repeating the step of emitting a plurality of light flashes of different colors within a flash duration interval.

6. The method according claim 5, wherein the step of emitting a plurality of light flashes of different colors within a flash duration interval is repeated between 40 times and 100 times per minute.

7. The method according claim 1, further comprising:
    emitting white light flashes, in case one or more human passengers are aboard the unmanned aerial vehicle.

8. A method of emitting an anti-collision light output from an unmanned aerial vehicle, comprising:
    emitting a plurality of light flashes of different colors within a flash duration interval, with the flash duration interval being at most 0.2 s;
    wherein the plurality of light flashes within the flash duration interval comprise at least one cyan light flash, at least one magenta light flash, and at least one yellow light flash.

9. The method according to claim 8, wherein the plurality of light flashes within the flash duration interval comprise exactly one cyan light flash, exactly one magenta light flash, and exactly one yellow light flash.

10. The method according to claim 8, wherein each of the plurality of light flashes within the flash duration interval is at least 20 ms.

11. The method according to claim 8, wherein the plurality of light flashes within the flash duration interval are of substantially equal length.

12. The method according to claim 8, further comprising:
    repeating the step of emitting a plurality of light flashes of different colors within a flash duration interval.

13. Method according to claim 12, wherein the step of emitting a plurality of light flashes of different colors within a flash duration interval is repeated between 40 times and 100 times per minute.

14. The method according to claim 8, further comprising:
    emitting white light flashes, in case one or more human passengers are aboard the unmanned aerial vehicle.

15. An anti-collision light for an unmanned aerial vehicle, comprising:
    a plurality of light sources of different colors; and
    a control unit coupled to the plurality of light sources,
    wherein the control unit is configured to control the plurality of light sources to emit a plurality of light flashes of different colors within a flash duration interval of at most 0.2 s, and
    wherein the control unit is configured to control the plurality of light sources to emit at least one blue light flash and at least one yellow light flash within a flash duration interval or wherein the control unit is configured to control the plurality of light sources to emit at least one cyan light flash, at least one magenta light flash, and at least one yellow light flash within a flash duration interval.

16. The Anti-collision light according to claim 15,
    wherein the plurality of light sources comprise a blue light source and a yellow light source, or
    wherein the plurality of light sources comprise a cyan light source, a blue light source, a red light source, and a yellow light source.

17. An anti-collision light according to claim 15, wherein the plurality of light sources are a plurality of LEDs.

18. An unmanned aerial vehicle comprising at least one anti-collision light in accordance with claim 15, the at least one anti-collision light anti-collision light being mounted to a vehicle body of the unmanned aerial vehicle.

19. The unmanned aerial vehicle according to claim 18, wherein the at least one anti collision light includes an upper anti-collision light arranged on an upper portion of the unmanned aerial vehicle and a lower anti-collision light arranged on a lower portion of the unmanned aerial vehicle.

20. The unmanned aerial vehicle according to claim 18, wherein the at least one of the at least one anti-collision lights has at least the following intensities:
    400 cd in a first angular range between 0° and 5° with respect to a horizontal plane through the unmanned aerial vehicle,
    240 cd in a second angular range between 5° and 10° with respect to the horizontal plane,
    80 cd in a third angular range between 10° and 20° with respect to the horizontal plane,
    40 cd in a fourth angular range between 20° and 30° with respect to the horizontal plane, and
    20 cd in a fifth angular range between 30° and 75° with respect to the horizontal plane.

* * * * *